United States Patent [19]
White et al.

[11] 3,851,531
[45] Dec. 3, 1974

[54] ELECTRONIC FUZE SYSTEM

[75] Inventors: Marvin H. White, Laurel; David D. O'Sullivan, Bethesda, both of Md.; Richard G. Hamel, Margate, Fla.

[73] Assignee: Westinghouse Electric Corporation, Pittsburgh, Pa.

[22] Filed: Apr. 17, 1973

[21] Appl. No.: 353,252

Related U.S. Application Data

[62] Division of Ser. No. 121,040, March 4, 1971, Pat. No. 3,750,583.

[52] U.S. Cl. .................................. 73/510, 73/517 R
[51] Int. Cl. ........................................... G01p 15/08
[58] Field of Search .......... 73/516 R, 517 R, 517 B, 73/510, 511, 503, 492; 102/78, 80; 235/92 AE; 200/61.45

[56] References Cited
UNITED STATES PATENTS
3,643,513   2/1972   Weaver ............................. 73/517 R Primary Examiner—James J. Gill
Attorney, Agent, or Firm—M. F. Oglo

[57] ABSTRACT

An electronic system for providing a safe/arm signal. A number of digital accelerometers are located in various parts of a moving body such as an artillery shell when the shell is fired, accelerometers measure acceleration in the setback acceleration - the acceleration in the direction of travel. Other accelerometers measure spin acceleration. When predetermined levels of both setback and spin accelerations have been present for predetermined times, a safe/arm signal is provided by logic circuitry.

11 Claims, 3 Drawing Figures

ELECTRONIC FUZE SYSTEM

CROSS-REFERENCE TO RELATED APPLICATION

This application is a division of application Serial No. 121,040, now Pat. No. 3,750,583 entitled "Electronic Fuse System" by M. H. White, D. D. O'Sullivan, and R. G. Hamel assigned to the same assignee as the present invention. It is related to application Serial No. 80,394, now Pat. No. 3,727,209 entitled "Digital Accelerometer" by M. H. White, R. G. Hamel, and D. D. O'Sullivan assigned to the same assignee. It is also related to a divisional application of the above-referenced application Serial No. 80,394 consisting of application Serial No. 184,673, now Pat. 3,764,820 assigned to the same assignee. It is further related to a copending divisional application of the above-referenced application Serial No. 80,394 consisting of application Serial No. 278,702 filed Aug. 7, 1972, assigned to the same assignee.

The invention herein described was made in the course of or under a contract or sub-contract thereunder with the Department of the Army.

BACKGROUND OF THE INVENTION

1. Field of The Invention

The present invention relates, generally, to systems which can use digital accelerometers. It explains how such accelerometers can be used in combination with various logic circuit elements to analyze various systems as they undergo accelerational changes. More specifically, the invention is concerned with providing a safe/arm signal for an explosive projectile such as an artillery shell by using an accelerometer in combination with other circuitry.

2. Description of The Prior Art

Most artillery shells, at the present time, rely upon mechanical fuze systems for their operation. An important part of these systems consists of a safing and arming device which requires the sensing of two environments to actuate the fuze. Sensing the two environments is accomplished by mechanically sensing setback (direction of travel) and centrifugal (spin) forces with weight and springs which permit unlatching and rotation of moving parts as long as the acceleration forces are sustained for a sufficiently long time.

Thus, it has been necessary for the setback and centrifugal forces to be applied in a serial time relationship for the safe/arming operation to be completed - the mechanical setback sensor must be activated to allow the spin sensor to be effective. Therefore, before a measurement could be made of the spin acceleration forces, measurement and sensing of the setback acceleration forces must have already occurred. Sensing and measuring of the two forces could not be made independently of one another.

BRIEF SUMMARY OF THE INVENTION

In general, the invention is a system which can provide acceleration information about any moving object. By placing an accelerometer on the moving object, it can be determined when the object is at least moving at a predetermined acceleration level. The determination is made by the accelerometer means and is indicated by the presence of a signal from the accelerometer.

A means is also provided to indicate if and when the object continues to move at least at the predetermined minimum acceleration for a predetermined period of time. If the object continues to move at the predetermined minimum acceleration, a second signal is provided by a counter, which is enabled by the accelerometer. A gating means is used to enable the accelerometer signal to the counter. When the counter reaches its full count it is effective to inhibit the transmission from the accelerometer to the counter by way of the gating means.

More specifically, the present invention provides an electronic fuze for an explosive projectile such as an artillery shell or a mortar. When used in such a situation, the system may require at least two accelerometer means so that accelerations in more than one direction can be sensed and measured. That is, both setback and spin accelerations may have to be measured. The system also provides a means for comparing the outputs of the two accelerometers because the outputs are developed independently of one another. If the comparing means receives the appropriate inputs it provides the desired safe/arm signal.

The comparison means is designed to measure the length of time over which certain selected accelerations are present. If the selected accelerations are present for the predetermined periods of time, then the safe/arm signal is given.

BRIEF DESCRIPTION OF THE DRAWINGS

For a better understanding of the invention, reference may be had to the preferred embodiment, exemplary of the invention, shown in the accompanying drawings in which.

DETAILED DESCRIPTION OF THE INVENTION

Figure 1:
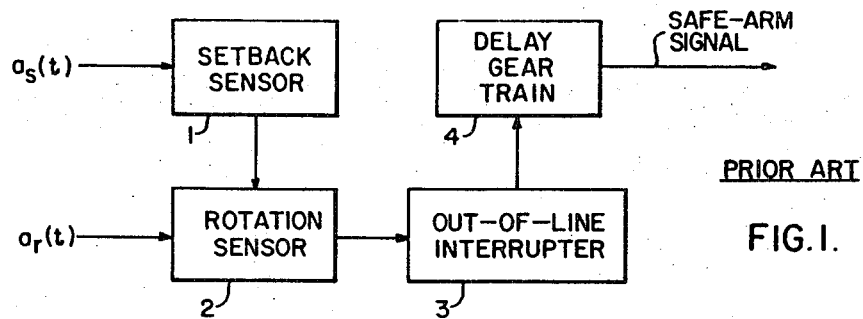
FIG. 1 is a functional block diagram which shows how the prior art devices operate.

The operation of present day mechanical fuzes can be explained by reference to FIG. 1. Setback sensor 1 receives as an input a force which is proportional to the setback acceleration, $a_s(t)$. Setback acceleration is defined as the acceleration in the direction of travel. In the specific case of an artillery shell, the setback acceleration would be in the direction in which the shell was fired.

When the setback acceleration reaches a predetermined level, the setback sensor is driven back against its spring and unlatches the rotation sensor 2. The rotation sensor 2 senses and measures the amount of spin through which the projectile is being subjected. This measurement is in the form of a measurement of rotational acceleration $a_r(t)$. As the rotational acceleration increases, the rotation sensor will start to rotate. The rotation of the rotation sensor 2 removes the out-of-line interrupter from its position in the powder train. The fuze is armed when the out-of-line interrupter is removed from the powder train. By means of gears 4, it is possible to control the time of arming such that a safe/arm takes place at the desired distance downrange from launch.

Figure 2:
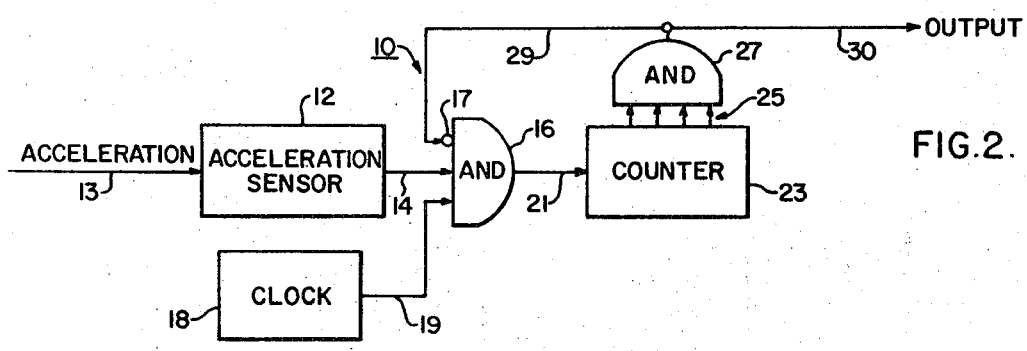
FIG. 2 is a circuit block diagram of a circuit which can indicate when any moving object has been subjected to a predetermined level of acceleration for a predetermined period of time.
Figure 3:
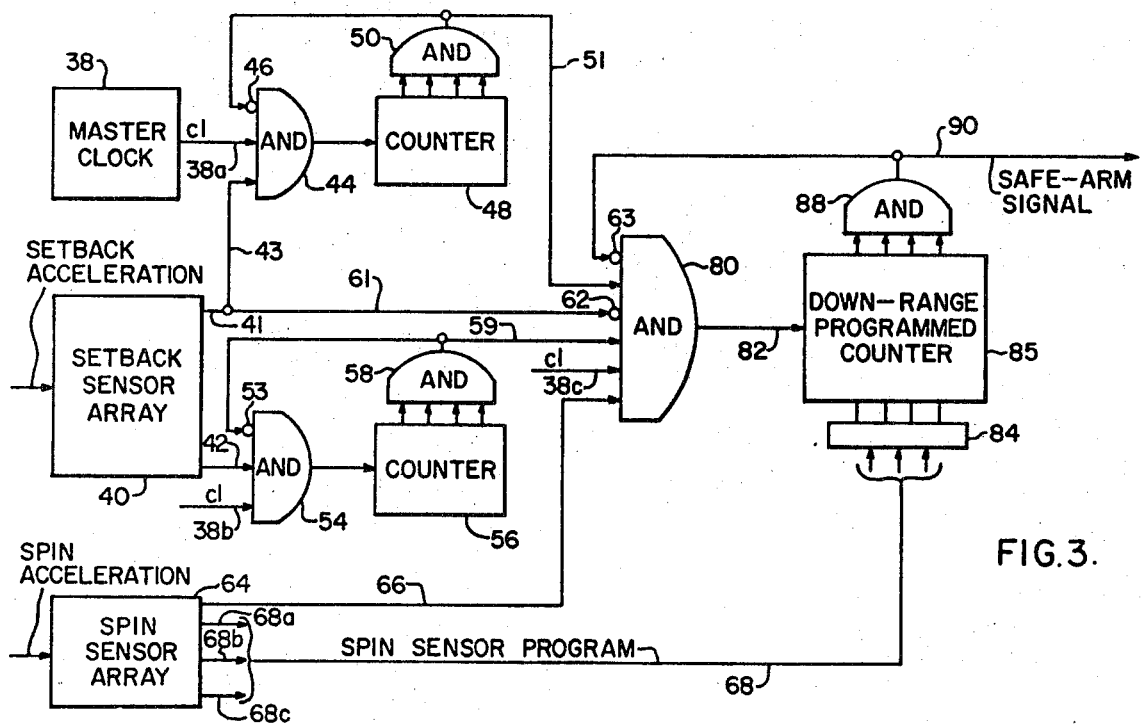
FIG. 3 is a circuit block diagram of a preferred embodiment of the invention which can provide a complete analysis of acceleration information.

FIG. 2 shows a subsystem 10 of the acceleration analyzing system illsutrated in FIG. 3. The subsystem 10 includes an acceleration sensor 12. Any kind of acceleration sensor can be used for this purpose. However, it must be capable of providing a very accurate indication of when the object on which it is placed is moving at or near a predetermined acceleration. Preferably, acceleration sensor 12 should be of the type which is described in the hereinbefore referenced U.S. Pat. No. 3,727,209. The acceleration sensor described in the aforementioned patent is a digital accelerometer. That is, it provides an output signal only when the object on which it is mounted reaches a predetermined acceleration level. Beginning at that point, and that point only, a digital accelerometer provides the output signal. The forces which act upon the acceleration sensor 12 are schematically represented by arrow 13 as an input to the acceleration sensor 12. The output of acceleration sensor 12 is a voltage which is represented schematically by arrow 14.

The output 14 of acceleration sensor 12 becomes one of the inputs to a gating means which includes AND gate 16. For definitional purposes, an AND gate is a circuit whose output will be a logic ONE only when each of its inputs is also a logical ONE, otherwise the output is at a logic ZERO. A logic ONE denotes the presence of a signal while a logic ZERO denotes the absence of a signal. That is, an AND gate will not provide an output signal if any one of its inputs is not a logical ONE.

AND gate 16 has three inputs. One of the inputs is the output signal 14 from the acceleration sensor 12. Another one of these inputs is provided by clock 18. Clock 18 provides a string of positive, timing pulses along line 19 to form the second input to AND gate 16.

The third input to AND gate 16 is an inhibit signal provided by an inverter which is symbolized by circle 17. For definitional purposes, an inverter provides a logical ONE output only when its input is a logical ZERO. Conversely, if the input to an inverter is a logical ONE, then its output will be a logical ZERO.

Therefore, when the object using the present acceleration sensing circuit is motionless, or when it is subjected to an acceleration which is less than a predetermined threshold level, two of the inputs to AND gate 16 are each receiving a logical ONE. The first logical ONE is provided by the positive portions of the string of pulses which is generated by clock 18. The second logical ONE is provided by inverter 17. When the object begins to accelerate and accelerates in such a manner that it traverses the acceleration threshold level selected by the design of the acceleration sensor 12, the third input logical ONE signal to AND gate 16 will be provided by accelerometer 12 along line 14.

As soon as a logical ONE is present on all three inputs of AND gate 16, the AND gate 16 enables the clock to proceed to provide a signal along line 21 — that is, it transmits a signal from the accelerometer 12 and clock 18 to counter 23. The clock pulses present on line 21 provide the input to a counter 23. The purpose of counter 23 is to count the number of pulses which are allowed to pass through the AND gate 16. The counter 23 generates a sequence of logical ONES when a predetermined minimum number of pulses enters the counter. If such a predetermined sequence of logical ONE signals appears on the counter, it necessarily follows that each of the input signals to AND gate 16 remained a logical ONE for a predetermined period of time. Alternatively, the sequence of logical ONE signals in the counter can be used to determine the total length of time over which all of the input signals to AND gate 16 simultaneously remain a logical ONE. The output of counter 23 which is a sequence of logical ONES is connected to another AND gate 27. The connection between counter 23 and AND gate 27 is indicated by arrows 25.

AND gate 27 can be designed to require any number of logical ONE inputs before it becomes conductive. It will be apparent to those having ordinary skill in the art that a high count or sequence of ONES in counter 23 can be obtained by requiring a high number of logical ONE inputs to AND gate 27.

When counter 23 reaches its predetermined count, each of the input points of AND gate 27 are receiving a logical ONE. At that time, AND gate 27 provides an output signal along line 30 to indicate that the selected acceleration level has been reached and/or traversed for a predetermined period of time. Simultaneously, the output signal from AND gate 27 is directed to the input of inverter 17 along line 29. Because the output signal on line 29 is a logical ONE, one of the inputs to AND gate 16 becomes a logical ZERO because of inverter 17. As a result, AND gate 16 no longer transmits the combined accelerometer signal 14 and the clock signal 19 to counter 23. Therefore, transmission of the combined signal will be terminated and the count in counter 23 will not advance — that is, none of its outputs will become a logical ZERO. As a further consequence, AND gate 27 will continuously provide an output signal along line 30 even though AND gate 16 becomes nonconductive.

FIG. 3 shows how the basic circuit described in FIG. 2 has been employed in a preferred embodiment. The preferred embodiment shown in FIG. 3 is usable on an explosive type of projectile such as an artillery shell or a mortar. Its purpose is to provide a safe/arm signal at a predetermined time after the projectile has been launched.

The preferred embodiment of FIG. 3 shows both a setback sensor array and a spin sensor array. Both sensor arrays are located in a fuze housing which is screwed into the nose of the shell (not shown). The manner of locating the fuze housing will be known and understood by those having ordinary skill in the art. The setback sensor array is located inside the fuze housing on the bore axis. The spin sensor array is also located in the fuze housing; but it is positioned a radial distance from the bore axis. The radial distance is determined by the acceleration forces which are to be sensed and will be discussed in more detail below.

However, it will be apparent to those skilled in the art that some projectiles will not need a spin sensor array because no spin is imparted to them upon launch. Likewise, those skilled in the art will also appreciate that the teachings of FIG. 3 need not be used solely to determine accelerational information about explosive projectiles. The circuitry shown in FIG. 3 can obviously be varied to determine accelerational information about other objects such as, for example, an automobile or a generator and/or to sense accelerations in other directions.

The circuit of FIG. 3 includes a setback sensor array 40 which provides information about accelerational changes in a transverse direction — e.g., in the direction of flight of the projectile. Setback sensor array 40 includes a plurality of accelerometers which are designed to provide a plurality of output signals as the acceleration of the projectile changes. Before a safe/arm signal can be given, the circuit must determine that the projectile has been fired. That is, it must distinguish among the following possibilities: accidental dropping of the projectile while it is being handled by personnel; acceleration forces exerted on the projectile while it is being transported in a truck, for example; and an actual firing or launch.

After the examination of the acceleration data on various types of projectiles, it was discovered that a "firing environment" could be distinguished from a "handling environment" if it attained an acceleration of 100g, where g is acceleration due to gravity, and if that acceleration were maintained for approximately 5 milliseconds (ms). Therefore, one of the digital accelerometers in the setback sensor array 40 is designed to provide an output signal on line 41 when the projectile on which it is mounted is accelerating at 100g or when it traverses the 100g level in a first direction — i.e. in the direction of increasing acceleration.

As was explained in the circuit of FIG. 2, the output of the accelerometer is connected to an AND gate and a counter in order to determine how long the projectile is subjected to a certain level of acceleration. Therefore, the output signal on line 41 is connected to AND gate 44. The signal on line 41 is conducted to AND gate 44 along line 43. Due to the presence of a logical ONE on line 43 at one of the inputs of AND gate 44 along with a logical ONE at another of the inputs due to inverter 46, AND gate 44 provides an output to counter 48 whenever master clock 38 provides a pulse along line 38a. Master clock 38 provides all of the clocking pulses where they are needed in the circuit. Its presence is indicated in FIG. 3 by an arrow and the letter c1 and reference number 38 with an appropriate letter descriptor.

The second criterion which was discovered to be necessary in order to determine that a firing has taken place is the length of time over which the projectile has reached and/or traversed the 100g acceleration level. Therefore, AND gate 50 is designated to provide an output signal only when the counter reaches that count which is necessary to indicate that the 100g acceleration level has been reached and/or traversed for 5 milliseconds. At that point in time, AND gate 50 provides a logical ONE to inverter 46 thereby terminating transmission of signals from AND gate 40 and, simultaneously, provides an output signal along line 51 to one input of AND gate 80. When AND gate 80 receives this first input, there is almost a 100 percent probability that the projectile has been launched vis-a-vis just bouncing around in the back of a truck.

Although the circuit now knows that the projectile has been launched, it still does not know if the launch was "good" from the standpoint of whether or not it will have enough acceleration to clear the launcher and get a sufficient distant down range. Therefore, the setback sensor array 40 includes a second digital accelerometer to determine if the projectile reaches and/or traverses the 600g acceleration level. The output from the digital accelerometer which provides an output signal when the projectile reaches and/or traverses the 600g level is conducted along line 42. The signal on line 42 is directed to AND gate 54. In response to the signal on line 42 and in response to the other input signals including the clock pulses along line 38b, AND gate 64 provides an output signal to counter 56. Counter 56, in combination with AND gate 58, provides an output signal if the projectile has reached and/or traversed the 600g acceleration level for at least 3 milliseconds. At this point, AND gate 58 provides an output to inverter 53 to thereby render AND gate 54 nonconductive and also provides a signal along line 59 to provide a second input to AND gate 80.

Setback sensor array 40 also provides an additional piece of information in combination with line 61 and inverter 62. When the projectile reaches and/or traverses the 100g acceleration level, a logical ONE appears on line 41 and, therefore, also on line 61 as an input to inverter 62. As a result, inverter 62 provides a logical ZERO to one of the inputs of AND gate 80 thereby being a contributing factor in rendering AND gate 80 nonconductive. It will be appreciated by those skilled in the art that the acceleration of the projectile will fall to ZERO a short time after the projectile leaves the barrel of the launcher. However, the velocity will remain constant for a long period of time after the shell leaves the barrel of the launcher. Therefore, when the shell leaves the barrel of the launcher, the acceleration of the projectile will traverse the 100g acceleration level in a second direction — the direction of decreasing acceleration — thereby causing a logical ZERO to occur on line 41 and also on line 61. A logical ZERO at the input of inverter 62 causes a logical ONE to appear at the related input of AND gate 80. It will be appreciated however, that the decrease in acceleration will not cause a cessation of the output signals from AND gate 50 or AND gate 58 because they become independently conductive once they are gated into a conductive mode. The purpose of providing an additional logical ONE along line 61 is to make sure that the projectile has cleared the barrel of the launcher so as to preclude an explosion inside the barrel. Inverter 62 therefore provides a third input to AND gate 80.

In addition to being subjected to high accelerations in the direction of flight, many artillery shells are intentionally subjected to a high rate of spin to insure stability during flight. Therefore, before a safe/arm signal can be given, a determination must be made as to whether or not the projectile is spinning at least at a predetermined rate. An easy way to measure this spin rate of the projectile is to measure the centrifugal acceleration of the object because spin rate is related to centrifugal acceleration by the equation $a_c = (2\pi n)^2 R$, where $a_c$ is the centrifugal acceleration, n is the spin rate in revolutions/sec., and R is the radial distance from the bore axis of the projectile to the sensor array located in the fuze housing. Therefore, a second sensor array, spin sensor array 64, is placed at a distance R from the projectile center (bore axis) which is determined by the aforementioned relationship between $a_c$, n and R. Of course, if the object being monitored is not subjected to spin, then a spin sensor array will not be required.

The input to the spin sensor array 64 is shown by an arrow labeled "spin acceleration". In order that the embodiment shown in FIG. 3 can be used on a number of different shells each of which spins at a different rate, the spin sensor array 64 is designed to provide an output along line 66 when the spin acceleration reaches and/or traverses the 100g level. When the signal appears on line 66, it is directed to AND gate 80 thereby providing a fourth logical ONE to that gate.

When the fourth logical ONE is directed to AND gate 80, the circuit has determined that all of the minimum conditions have been met for providing a safe/arm signal. That is, the signal on line 51 has indicated that the projectile has been fired and that it is not merely being bounced around in the back of the truck. The signal on line 59 has indicated that the projectile has been given enough acceleration in the direction of flight to reach its desired target destination. The signal on line 61 has indicated that the projectile has left the barrel of the launcher so that there will not be an explosion inside the barrel. The signal on line 66 has indicated that the projectile has been given sufficient spin so that it will not wander off course. Each of the aforementioned logical ONE signals, the circuitry which generates them, and AND gate 80 acts, in effect, as a comparison mechanism for the accelerometer signals. Therefore, when all of the aforementioned signals provide a logical ONE into the AND gate 80, the logical ONE provided by inverter 63 and the clock pulses along line 38c all coact to provide an output signal from AND gate 80 along line 82.

If desired, the signal on line 82 could be used to provide the safe/arm signal. However, each projectile must travel a certain distance down-range in a certain direction before it is fired. The down-range distance is related to the muzzle velocity because $d = V_m t$, where $d$ is the down range distance, $V_m$ is the muzzle velocity and $t$ is time. Therefore, once the muzzle velocity is known, it is easy to determine how far down-range the projectile has traveled by measuring the time of travel.

An indication of muzzle velocity $V_m$ may be obtained by measuring the spin acceleration because $V_m = nBT$, where B is the bore diameter, and T is inverse twist of the barrel. That is, the muzzle velocity is directly proportional to the spin rate, $n$. Because n is also related to centrifugal acceleration by $a_c = (2\pi n)^2 R$, a plurality of additional accelerometers are placed in the spin sensor array in order to determine the approximate spin rate, muzzle velocity, and down-range distance. A plurality of sensors are employed because the preferred embodiment is used with a plurality of different projectiles, each of which may require different acceleration rates.

No attempt need be made to determine the exact spinning rate which the projectile eventually attains. A determination need only be made of a particular range of spin. In the preferred embodiment shown in FIG. 3, three additional digital accelerometers are used. Their outputs are shown at 68a, 68b, 68c. These three output signals then become the spin sensor time to safe/arm program and are conducted, as symbolized by line 68, to a down range programmed counter. In the preferred embodiment of FIG. 3, the accelerometer supplying output line 68a is designed to provide an output signal at the 1500g acceleration level, the accelerometer supplying an output signal on line 68b is designed to provide an output signal at the 1000g level, and the accelerometer providing an output signal on line 68c is designed to provide a signal at the 400g level.

Different projectiles must be armed at different distances down range. Down range counter 85 is adjustable to provide the safe/arm signal which is appropriate for the particular shell being fired. The down range counter 85 is preset to respond to the different possible inputs from the spin sensor array. By properly programming counter 85 in the appropriate manner, it will preset its count to a greater or lesser count depending upon the input which is received from the spin sensor array. Therefore, if a low spin acceleration is indicated, the counter may, in one embodiment, require a smaller number of additional pulses from line 82 before it is completely filled than would be the case if a large spin acceleration were sensed. Of course, the particular combination of requirements would be easily adjustable by those skilled in the art.

In order to transmit the spin acceleration information to the counter 85, the signals appearing on lines 68a, 68b, and 68c representing a spin sensor program are connected to logic circuitry 84 via conducting means 68. Logic circuitry 84 will provide a different input to counter 85 depending on how many signals it receives on conducting means 68, that is, depending upon the spin rate and, therefore, the muzzle velocity. The combination of the signals from the spin sensor array 64 and the signal from output line 82 determines the count which will program counter 85 such that the number of clock pulses on line 82 required to fill counter 85 will be altered. When counter 85 is filled, AND gate 88 becomes conductive and provides a logical ZERO to the input of inverter 63 thereby disabling AND gate 80. Simultaneously, the output of AND gate 88 provides a safe/arm signal along line 90.

What has been described therefore is a system which can provide a great amount of accelerational information about a moving object. The described system cannot only determine the rate of acceleration in more than one direction but can also determine the length of time over which the object has traversed certain selected acceleration levels. In response to certain selected predetermined acceleration levels having been traversed for predetermined periods of time, certain portions of the circuit can provide output signals to trigger other parts of the circuit or other circuits. When applied to fuze design, the teachings of the present invention result in fuze housings which can be significantly smaller in size around 50 percent lighter in weight than prior art housings.

It will be apparent to those skilled in the art that the teachings of this circuit are not limited to explosive projectiles. They can also be used in guidance control, for example, or in any other situation where it is desired to have accelerational information in the form of indications or controls in response to an object attaining certain selected acceleration levels in any of a plurality of directions.

We claim as our invention:

1. A circuit for providing acceleration information about an object comprising, in combination;
   an accelerometer means for signaling when said object attains at least a predetermined minimum acceleration level, said signal being present only when said object continues to move at least at said predetermined minimum acceleration level;
   means responsive to said accelerometer signal for providing a second signal indicate the sustained presence of said accelerometer signal for a predetermined time; and
   means for transmitting said accelerometer signal to said means responsive to said accelerometer signal and for terminating said transmission in response to said second signal.

2. The circuit of claim 1 wherein;
   said accelerometer means is operable to output a third signal when the acceleration of said object falls below said predetermined acceleration level; and means for providing a fourth signal in response to said second and third signals.

3. The circuit of claim 1 wherein said means responsive to said accelerometer signal includes;
   means for providing clock pulses;
   a clock pulse counter;
   a clock pulse gate operable to pass the clock pulses to said counter only during presence of said accelerometer signal; and
   means for providing said second signal in response to the output of the clock pulse counter reaching a predetermined count condition.

4. Apparatus for providing accelerational information about an object comprising, in combination;
   accelerometer means subject to substantially the same acceleration forces as said object and operable to
   sense where individual selected acceleration levels of a plurality of selected acceleration levels are traversed by the acceleration of said object and to provide a respective individual signal to indicate occurrence of each such traversal;
   a corresponding plurality of first circuit means responsive to said accelerometer signaling, each being operable to measure the lengths of time of sustained traversals, in one of the opposite senses in which the respective acceleration level may be traversed, of said selected acceleration levels; and
   a corresponding plurality of second circuit means, each for transmitting the respective individual signal to the first circuit means and for terminating said transmission in response to the respective individual signal, being sustained for a respective predetermined length of time.

5. The apparatus of claim 4 wherein at least one of said plurality of first circuit means includes means operable to indicate transversal of the corresponding selected acceleration level in the other of said opposite senses.

6. The apparatus of claim 5 wherein at least one of said plurality of first circuit means includes additional means for indicating when the transversal of the corresponding acceleration level in said one of said opposite senses has continued for its respective predetermined period of time.

7. The circuit of claim 4 wherein;
   each first circuit means includes means for providing clock pulses, a clock pulse counter, and a clock pulse gate operable to pass said clock pulses to said counter only during presence of said respective individual signal of the accelerometer means for the corresponding selected acceleration level; and
   each second circuit means of the plurality of second circuit means being operable to terminate such transmission to the corresponding first circuit means in response to the output of the clock pulse counter reaching a respective predetermined count condition.

8. Apparatus for providing accelerational information about an object comprising, in combination;
   accelerometer means subject to substantially the same acceleration forces as said object and operable to signal whenever said object substantially traverses selected acceleration levels;
   circuit means responsive to said accelerometer signaling, said circuit means including means operable to measure the lengths of time of sustained transversals, in one of the opposite senses in which said selected acceleration levels may be traversed, of said selected acceleration levels,
   said accelerometer means including a predetermined number of digital accelerometers, each of said digital accelerometers being operable to provide a signal,
   selected individual digital accelerometers of said number of accelerometers being disposed on said object such that they are responsive to accelerations in a first direction of a plurality of directions when said object is subject to accelerations in said first direction;
   additional selected individual digital accelerometers of said number of accelerometers being disposed on said object such that they are responsive to accelerations in a second direction of said plurality of directions when said object is subject to acceleration in said second direction; and
   one of said first and second directions is translational and the other of said first and second directions is rotational.

9. Apparatus for providing acceleration information about an object comprising, in combination;
   at least two accelerometers, each of which is subject to substantially the same acceleration forces as said object, said at least two accelerometers comprising a first accelerometer operable to provide a first signal whenever said object substantially traverses a selected translational motion acceleration level along an axis having a predetermined spacial relationship to the object and a second accelerometer operable to provide a second signal whenever said object substantially traverses a selected rotational motion acceleration level about said axis,
   first circuit means responsive to the first signal for providing a third signal to indicate the sustained presence of said first signal for a predetermined length of time; and
   second circuit means responsive to said second and third signals to provide a fourth signal to indicate the object has traversed said selected rotational motion acceleration level but only after such traversal of the selected translational motion acceleration level has been sustained for said predetermined length time.

10. The apparatus of claim 9 and means for transmitting said first signal to said first circuit means and for terminating said transmission in response to said third signal.

11. The circuit of claim 10 wherein said first circuit means includes;
    means for providing clock pulses;
    a clock pulse counter;
    a clock pulse gate operable to pass the clock pulses to said counter only during presence of said first signal; and
    means for providing said third signal in response to the output of the clock pulse counter reaching a predetermined count condition.

* * * * *